Nov. 20, 1923.  
D. H. SMITH  
RESILIENT WHEEL  
Filed Sept. 27, 1922

Inventor  
D. H. Smith

Nov. 20, 1923.
D. H. SMITH
1,474,737
RESILIENT WHEEL
Filed Sept. 27, 1922
2 Sheets-Sheet 2
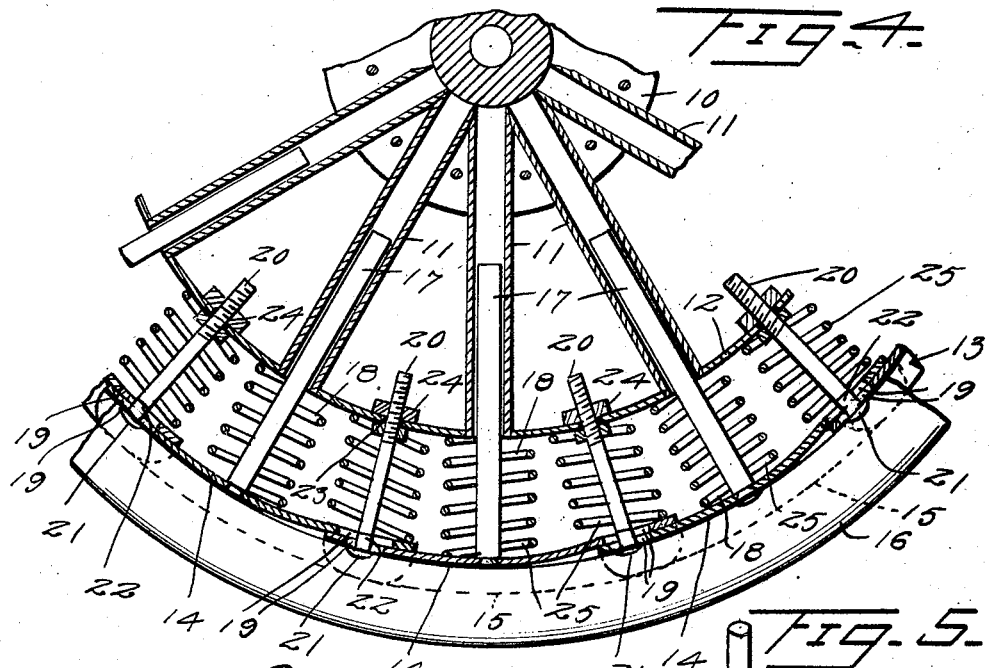
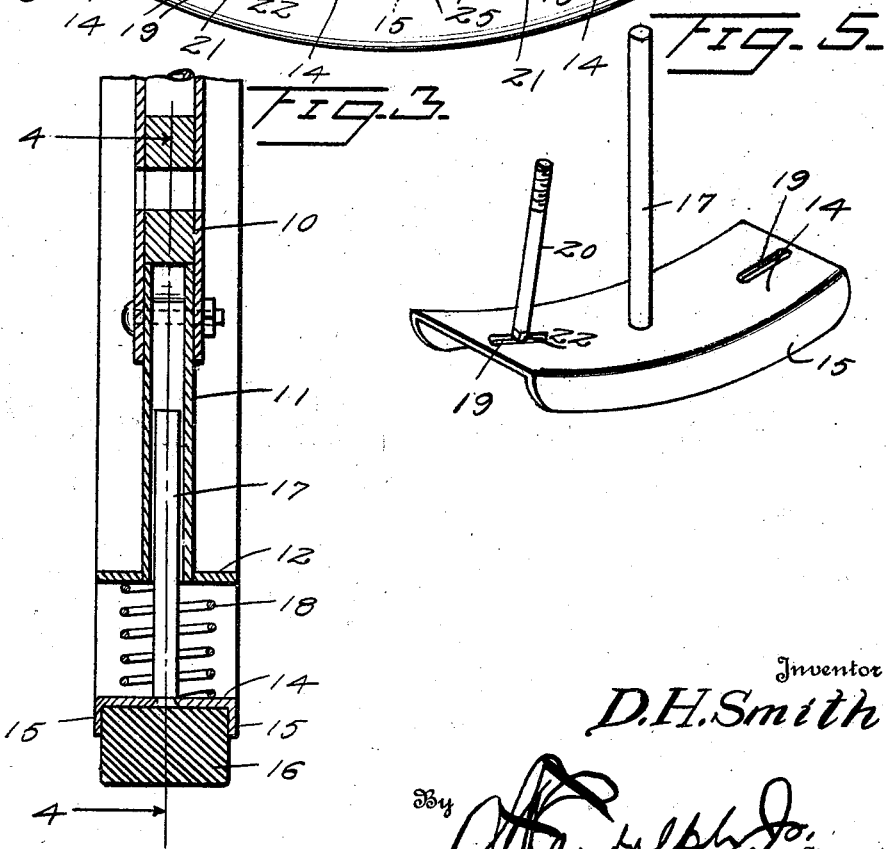
Inventor
D. H. Smith Patented Nov. 20, 1923.

1,474,737

UNITED STATES PATENT OFFICE.

DONALD H. SMITH, OF ADELAIDE, SOUTH AUSTRALIA, AUSTRALIA.

RESILIENT WHEEL.

Application filed September 27, 1922. Serial No. 590,894.

*To all whom it may concern:*

Be it known that I, DONALD H. SMITH, a subject of the King of Great Britain, residing at Adelaide, in the State of South Australia, Australia, have invented certain new and useful Improvements in a Resilient Wheel; and I do hereby declare the following to be a full, clear, and exact description of the invention, such as will enable others skilled in the art to which it appertains to make and use the same.

This invention relates to a resilient wheel for use on vehicles generally but particularly on automobiles or other vehicles of the self-propelled type.

It is aimed to provide a novel construction of wheel utilizing spring means to afford the same riding qualities as and to supplant the use of pneumatic tires.

Another object is to provide in such a construction, an outer tire-supporting rim which is contractile or capable of reduction in diameter so as to facilitate application and removal of a tire.

A third object is to provide a construction in which the said tire-supporting rim is made in a plurality of sections overlapping each other and having slip connection with each other and integral bolts extending therefrom and nuts coacting therewith to maintain them retracted.

Additional objects and advantages will become apparent from a consideration of the description following taken in connection with accompanying drawings illustrating one operative embodiment.

In said drawings:—

Figure 3 is a vertical sectional view through the wheel on the line 3—3 of Figure 1;

Figure 4 is a vertical sectional view through the wheel on the line 4—4 of Figure 3 and taken at a right angle to Figure 3; and Figure 5 is a detail perspective view of one of the outer rim sections integral therewith.

Like reference characters designate like or similar parts in the different views.

Figure 1:
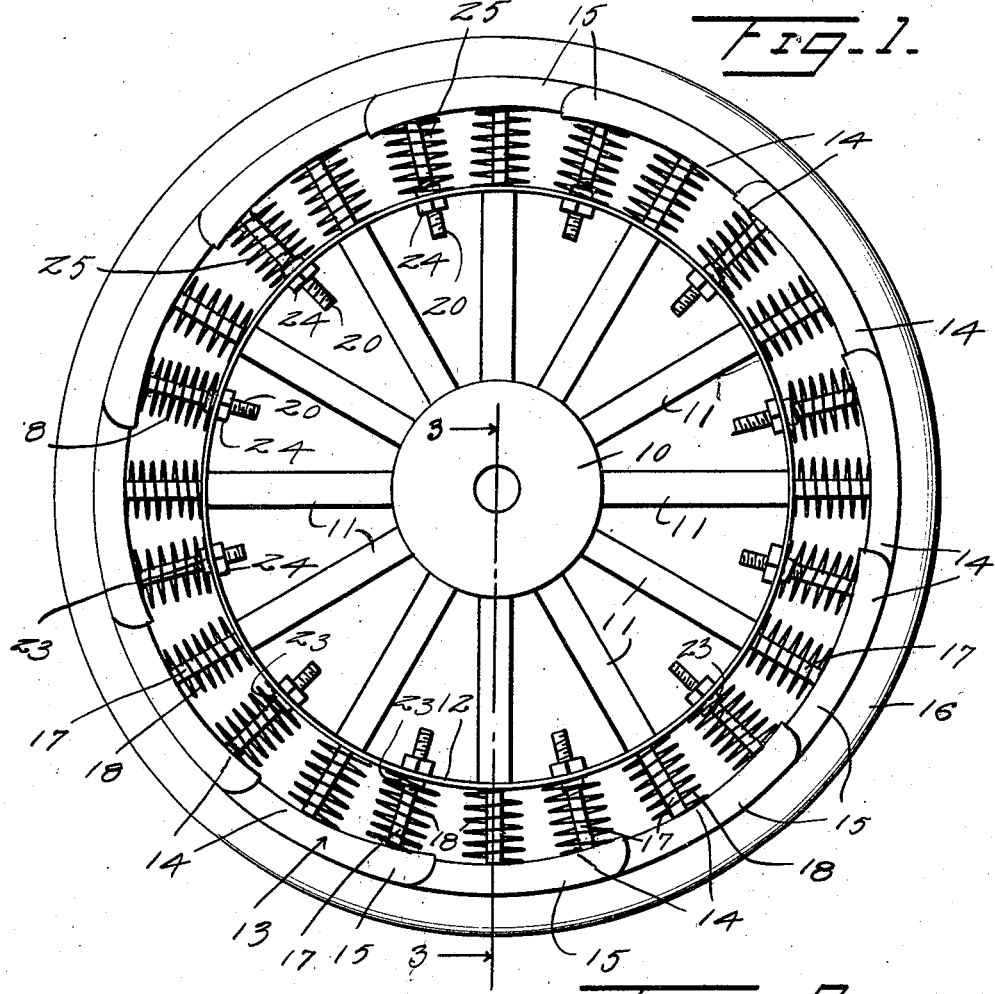
Figure 1 is a side elevation of a wheel constructed in accordance with my invention.
Figure 2:
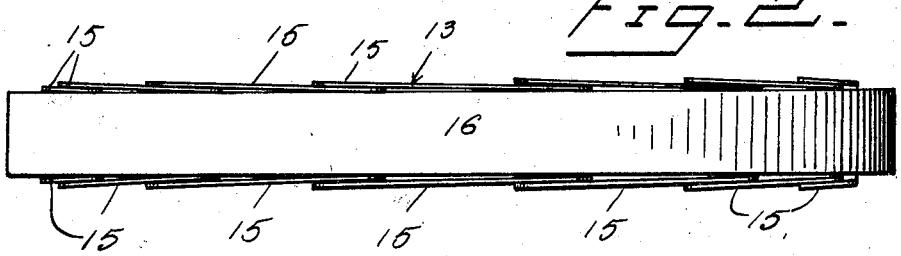
Figure 2 is a plan view of the wheel.

In reducing the invention to practice, the wheel is provided with a suitable hub 10 for attachment to an axle as usual and from which suitable numbers of spoke sections 11 radiate which are secured at their outer ends to an inner rim 12. It will be noted that the spoke sections 11 are hollow and thus the inner rim 12 is open or cut away in line with the hollows of the spoke sections.

An outer rim is provided at 12 which is made up of a plurality of rim sections 14 with one end of each section overlapping the adjacent end of the other section. These sections have outwardly extended flanges 15 which coact to provide a channel to receive and retain a suitable tire 16, which for example may be of the solid rubber type but which of course may be of any form preferred. Extending integrally from each section 14 is a spoke section 17 which extends into and is slidably mounted by the adjacent spoke section 11. Cushioning springs 18 may surround the spokes 17 and at their inner ends engage the rim 12 and at the outer ends engage the section 14. At the overlapping ends, sections 14 have sliding or slip connection with each other and are there provided with alining enlarged or elongated slots 19 through which bolts 20 pass. The bolts 20 have heads 21 which overlap the tire-receiving surfaces of the sections 14 and they have square portions 22 disposed in the slot 19 so that the bolts will not turn therein. The bolts 20 also pass snugly and slidably through openings in the rim 12 as in bushings 23 and inwardly beyond said rim 12 are provided with nuts 24. Surrounding the bolts 20 are cushioning springs 25 which engage the rims 12 at their inner ends and the sections 14 at their outer ends.

The springs 18 and 25 are similar and preferably of heavy coil metallic construction and are of the expansive type so as to resiliently resist inward thrust of the sections 14.

In use, shocks and jars incidental to travel of the wheel are absorbed by the springs 18 and 25 as will be realized, since the sections 14 may move radially and also have sliding or slip connection with each other. It will be noted that three springs resist the movement of each of the sections 14 which very efficiently resist the thrust of the sections.

Particular attention is called to the fact that the nuts 24 may be operated so as to draw the sections 14 or a number of them, inwardly towards the hub of the wheel and maintain them in that position so that the diameter of the rim 13 is decreased in order to facilitate the application or removal of a tire to the rim 13. After the tire is in place, the nut may be turned in the opposite direction so that the springs 18 and 25 may have full expansive effect to tightly engage the tire and secure it in place.

It should be mentioned that the construction may be manufactured at minimum expense and that the practicability of forming spoke sections 17 integral with sections 14 conduces greatly toward this end.

As merely an operative embodiment has been illustrated and described, it is understood that changes in the details may be resorted to provided they fall within the spirit and scope of the invention.

I claim as my invention:—

1. A wheel having a tire-mounting rim, said rim being in sections overlapping one adjacent section and underlapping the other adjacent section, means providing a slip connection between said sections, an inner rim, adjustable bolts extending from the inner rim, said sections having slots through which the bolts pass, and cushioning springs intermediate the sections and the inner rim.

2. A wheel having a tire-mounting rim, said rim being in sections, an inner rim, hollow spokes on which the inner rim is provided, said sections having spoke sections in telescopic relation with said hollow spokes, said rim sections overlapping and provided with elongated slots, bolts passing through said elongated slots and inner rim, and cushioning means between said sections and inner rim.

3. A wheel having a tire-mounting rim, said rim being in sections, an inner rim, hollow spokes on which the inner rim is provided, said sections having spoke sections in telescopic relation with said hollow spokes, said rim sections overlapping and provided with elongated slots, bolts passing through said elongated slots and inner rim, and cushioning means between said sections and inner rim, surrounding said bolts and said spokes.

4. A wheel having a tire-mounting rim, said rim being in sections, each section at one end overlapping the adjacent section, each section at the other end underlapping the adjacent section, fastening means operable to move said sections toward the center of the wheel, said sections having slots through which said means pass, and cushioning means for the sections urging them to normal position.

In testimony whereof I affix my signature in presence of two witnesses.

DONALD H. SMITH.

Witnesses:
GEO. BARTLESS,
H. HURST.